US009791770B1

(12) United States Patent
Huang

(10) Patent No.: US 9,791,770 B1
(45) Date of Patent: Oct. 17, 2017

(54) LIGHT-SOURCE MODULE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/206,309

(22) Filed: Jul. 10, 2016

(30) Foreign Application Priority Data

Apr. 15, 2016 (TW) .............................. 105111752 A

(51) Int. Cl.
*G03B 21/28* (2006.01)
*G03B 35/16* (2006.01)
*H04N 13/04* (2006.01)
*G03B 35/22* (2006.01)
*G02B 26/08* (2006.01)
*G03B 21/20* (2006.01)
*G03B 21/00* (2006.01)

(52) U.S. Cl.
CPC ......... *G03B 35/22* (2013.01); *G02B 26/0816* (2013.01); *G03B 21/008* (2013.01); *G03B 21/2066* (2013.01); *G03B 21/28* (2013.01); *G03B 35/16* (2013.01); *H04N 13/0418* (2013.01); *H04N 13/0427* (2013.01)

(58) Field of Classification Search
CPC ........ G03B 21/28; G03B 33/08; G03B 35/16; H04N 13/0402; H04N 13/0418; H04N 13/0427; H04N 13/045; H04N 13/0436; H04N 13/0438; G02B 13/16

USPC ................. 353/7, 98, 99; 359/649, 650, 651
See application file for complete search history.

(56) References Cited

U.S. PATENT DOCUMENTS

| 6,793,345 | B2 | 9/2004 | Dho |
| 8,624,960 | B2 | 1/2014 | Unkel et al. |
| 8,651,667 | B2 | 2/2014 | Katou |
| 2013/0321718 | A1* | 12/2013 | Huang ............... H04N 13/0418 349/5 |
| 2014/0293170 | A1* | 10/2014 | Huang ................... G03B 21/28 349/15 |

(Continued)

FOREIGN PATENT DOCUMENTS

| CN | 103376634 A | 10/2013 |
| CN | 103454848 A | 12/2013 |

(Continued)

*Primary Examiner* — Ryan Howard
(74) *Attorney, Agent, or Firm* — CKC & Partners Co., Ltd.

(57) ABSTRACT

A light-source module includes a light-source unit, a first projection lens, a first lens, a mirror wheel, a first light-guiding unit, a second light-guiding unit, and a second projection lens. The first projection lens has an entrance pupil. The light beam provided by the light-source unit can pass through the first projection lens via the entrance pupil and then is guided to the mirror wheel. With the rotation of the mirror wheel, when the light beam passes through the mirror wheel, it becomes a transmission light beam. At different time, when the light beam is reflected by the mirror wheel, it becomes a reflection light beam. The second projection lens has a first exit pupil and a second exit pupil, in which the transmission light beam and the reflection light beam pass through the second projection lens via the first exit pupil and the second exit pupil, respectively.

12 Claims, 6 Drawing Sheets

(56) References Cited

U.S. PATENT DOCUMENTS

2016/0134861 A1    5/2016   Huang

FOREIGN PATENT DOCUMENTS

| TW | 200423728 A | 11/2004 |
|---|---|---|
| TW | 201415084 A | 4/2014 |
| TW | 201502587 A | 1/2015 |
| TW | 201531791 A | 8/2015 |
| TW | 201618547 A | 5/2016 |

\* cited by examiner

LIGHT-SOURCE MODULE

RELATED APPLICATIONS

This application claims priority to Taiwanese Application Serial Number 105111752, filed Apr. 15, 2016, which is herein incorporated by reference.

BACKGROUND

Technical Field

The present disclosure relates to a light-source module.

Description of Related Art

With the development of technology, an optical product which can show a stereoscopic image has become a focal point in the consumer market. By exploiting the binocular parallax, a stereoscopic display device can provide images respectively to two eyes of an observer through optical elements, such that the observer can experience a stereoscopic image. Thus, by exploiting the binocular parallax of humans, the stereoscopic display device can respectively provide different images to two eyes of the observer, thereby achieving a stereoscopic display. In the stereoscopic display devices, an autostereoscopic display device can transmit light beams of different images to different spatial positions. On the other hand, zones have visible stereoscopic images provided by the stereoscopic display device can be determined by a light-source module. In other words, the performance of the stereoscopic display device is relative to the light-source module.

SUMMARY

An aspect of the present disclosure is to provide a light-source module including a light-source unit, a light-guiding module, a first projection lens, and a second projection lens, in which the light-guiding module includes a first lens, a mirror wheel, a first light-guiding unit, and a second light-guiding unit. The light-source module can switch a light beam provided by the light-source unit to a transmission light beam and a reflection light beam through the mirror wheel. The transmission light beam and the reflection light beam can be respectively guided to a first exit pupil and a second exit pupil by the first light-guiding unit and the second light-guiding unit, in which the first exit pupil and the second exit pupil are arranged as the row, thereby doubling the etendue of the light-source unit in the row direction.

An aspect of the present disclosure is to provide a light-source module including a light-source unit, a first projection lens, a first lens, a mirror wheel, a first light-guiding unit, a second light-guiding unit, and a second projection lens. The light-source unit is configured to provide a light beam. The first projection lens has an entrance pupil, in which the light beam provided by the light-source unit can pass through the first projection lens via the entrance pupil. The first projection lens is optically coupled between the light-source unit and the first lens. The first lens is disposed to guide the light beam to the mirror wheel. The light beam passes through the mirror wheel at a first time point to become a transmission light beam. The light beam is reflected from the mirror wheel to the first lens at a second time point to become a reflection light beam, in which the first time point is different from the second time point. The first light-guiding unit is disposed to guide the transmission light beam. The second light-guiding unit is disposed to guide the reflection light beam passing through the first lens, in which the transmission light beam and the reflection light beam are respectively guided to the same side of the first lens by the first light-guiding unit and the second light-guiding unit. The second projection lens is disposed to receive the transmission light beam and the reflection light beam, in which the second projection lens has a first exit pupil and a second exit pupil. The first exit pupil and the second exit pupil are arranged to be a row, and the transmission light beam and the reflection light beam respectively pass through the second projection lens via the first exit pupil and the second exit pupil.

In some embodiments, the first lens, the mirror wheel, the first light-guiding unit, and the second light-guiding unit are optically coupled between the first projection lens and the second projection lens.

In some embodiments, the entrance pupil and one of the first exit pupil and the second exit pupil have the same area.

In some embodiments, the light-source unit includes a light emitter, a digital micro-mirror device (DMD), and a third light-guiding unit. The light emitter is configured to provide the light beam. The third light-guiding unit is optically coupled between the light emitter and the DMD, in which the third light-guiding unit is configured to guide the light beam emitted from the light emitter to the DMD and guide the light beam reflected from the DMD to the first projection lens.

In some embodiments, the light-source module further includes a fourth light-guiding unit, in which the fourth light-guiding unit includes a first mirror and a second lens. The first mirror is optically coupled between the first lens and the mirror wheel and configured to guide the light beam propagated from the first lens to the mirror wheel. The second lens is optically coupled between the first mirror and the mirror wheel and configured to converge the light beam propagated from the first mirror on the mirror wheel.

In some embodiments, the first light-guiding unit includes at least one reflective interface, and the first light-guiding unit makes the transmission light beam be deflected by an angle of at least 90 degrees through the reflective interface.

In some embodiments, the first light-guiding unit includes a first reflection unit, a second reflection unit, and a third lens. The second reflection unit is optically coupled between the first reflection unit and the third lens. After the transmission light beam passing through the mirror wheel is reflected from the first reflection unit, the transmission light beam enters the third lens and the second reflection unit in sequence. The first light-guiding unit guides the transmission light beam to the first exit pupil through the third lens.

In some embodiments, the first lens converges the reflection light beam on a focal plane thereof. The third lens converges the reflection light beam on a focal plane thereof, in which the focal plane of the first lens and the focal plane of the third lens are orthogonal to each other.

In some embodiments, the second light-guiding unit includes a second mirror having a reflective interface. The reflective interface is extended along an extending direction equally dividing an angle between the focal plane of the first lens and the focal plane of the third lens, and the second light-guiding unit guides the reflection light beam to the second exit pupil through the reflective interface of the second mirror.

In some embodiments, an optical axis of the first lens, an optical axis of the third lens, an edge of the second mirror are at least intersected at one point.

In some embodiments, the second light-guiding unit includes a second mirror having a reflective interface. The reflective interface is extended along an extending direction slanted at an angle relative to an optical axis of the first lens, in which the angle is in a range from 30 degrees to 60 degrees. The second light-guiding unit guides the reflection light beam to the second exit pupil through the reflective interface of the second mirror.

In some embodiments, the mirror wheel has at least one first zone and at least one second zone. The first zone is configured to allow the light beam to pass therethrough at the first time point, so as to become the transmission light beam. The second zone is configured to allow the light beam to reflect back to the first lens at the second time point, so as to become the reflection light beam. A ratio of an area of the first zone to an area of the second zone is in a range from 0.5 to 1.5.

DETAILED DESCRIPTION

Figure 1:
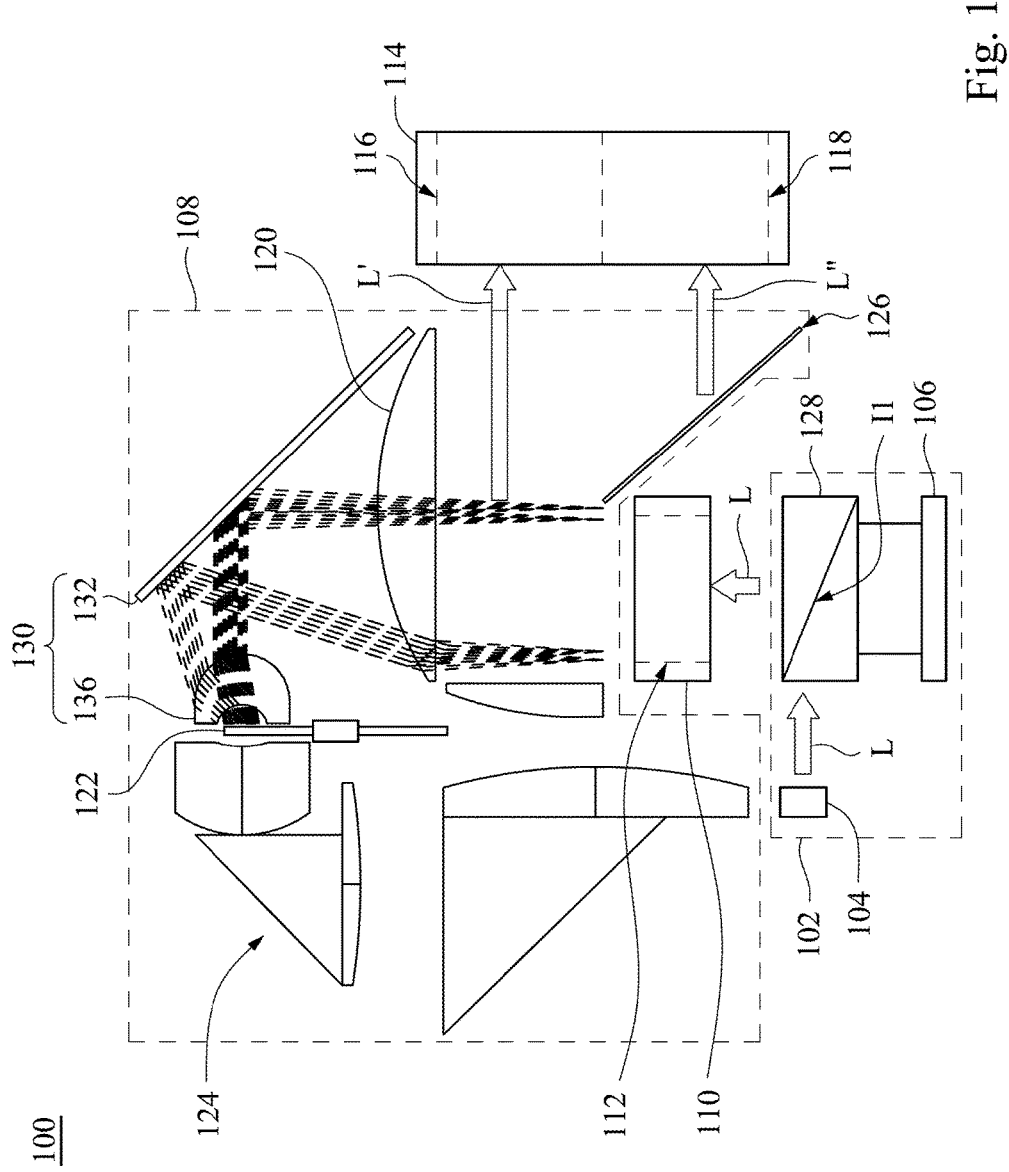
FIG. 1 is a schematic diagram showing a configuration of a light-source module according to some embodiments of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc. may be used herein to describe various elements, components, regions, layers and/or sections, these elements, components, regions, layers and/or sections should not be limited by these terms.

A light-source module of the present disclosure includes a light-source unit, a light-guiding module, a first projection lens, and a second projection lens, in which the light-guiding module includes a first lens, a mirror wheel, a first light-guiding unit, and a second light-guiding unit. The light-source module can switch a light beam provided by the light-source unit to a transmission light beam and a reflection light beam through the mirror wheel. The transmission light beam and the reflection light beam can be respectively guided to a first exit pupil and a second exit pupil by the first light-guiding unit and the second light-guiding unit, in which the first exit pupil and the second exit pupil are arranged as the row, thereby doubling the etendue of the light-source unit in the row direction.

FIG. 1 is a schematic diagram showing a configuration of a light-source module 100 according to some embodiments of the present disclosure. A light-source module 100 includes a light-source unit 102, a light-guiding module 108, a first projection lens 110, and a second projection lens 114. The light-source unit 102 is configured to provide a light beam L to the first projection lens 110. The light-guiding module 108 includes a first lens 120, a mirror wheel 122, a first light-guiding unit 124, and a second light-guiding unit 126, in which the light-guiding module 108 is optically coupled between the first projection lens 110 and the second projection lens 114. Thus, the first lens 120, the mirror wheel 122, the first light-guiding unit 124, and the second light-guiding unit 126 are optically coupled between the first projection lens 110 and the second projection lens 114. Therefore, the light beam L provided by the light-source unit 102 can pass through the first projection lens 110, the light-guiding module 108, and the second projection lens 114 in sequence. In addition, the light-guiding module 108 including the first lens 120, the mirror wheel 122, the first light-guiding unit 124, and the second light-guiding unit 126 can be taken as a relay lens.

The light-source unit 102 includes a light emitter 104, a digital micro-mirror device (DMD) 106, and a third light-guiding unit 128. The light emitter 104 is configured to provide the light beam L. The third light-guiding unit 128 is optically coupled between the light emitter 104 and the DMD 106, in which the third light-guiding unit 128 is configured to guide the light beam L emitted from the light emitter 104 to the DMD 106. In the present embodiment, the third light-guiding unit 128 can be a combination of at lest one lens and at least one prism and includes a reflective interface I1. The reflective interface I1 of the third light-guiding unit 128 can reflect the light beam L propagated from the light emitter 104 to the DMD 106. After the light beam enters the DMD 106, the light beam L can have at least one image signal and is reflected from the DMD 106. Then, the light beam L reflected from the DMD 106 can be guided to the first projection lens through the third light-guiding unit 128.

Figure 2B:
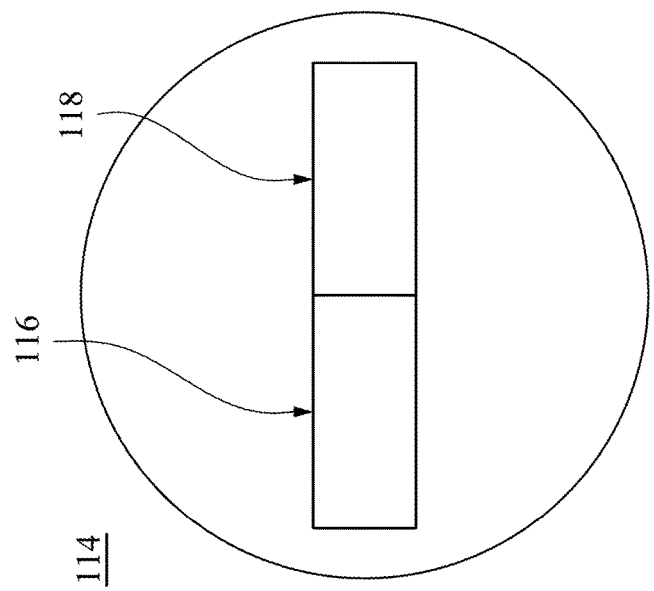
FIG. 2B is a schematic front view of the second projection lens illustrated in FIG. 1.
Figure 2A:
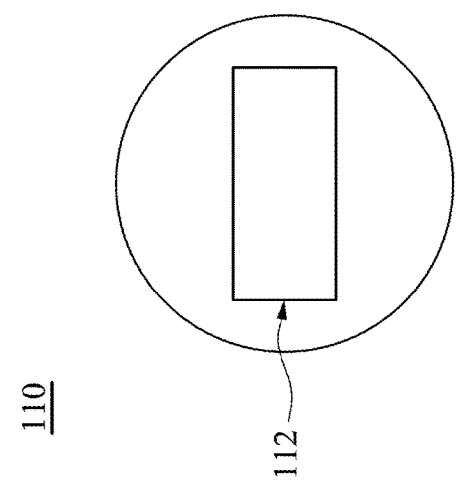
FIG. 2A is a schematic front view of the first projection lens illustrated in FIG. 1.

FIG. 2A is a schematic front view of the first projection lens 110 illustrated in FIG. 1. FIG. 2B is a schematic front view of the second projection lens 114 illustrated in FIG. 1. As shown in FIGS. 1, 2A, and 2B, the first projection lens 110 is optically coupled between the light-source unit 102 and the first lens 120. The first projection lens 110 has an entrance pupil 112. The light beam L provided by the light-source unit 102 can pass through the first projection lens 110 via the entrance pupil 112 and then travel to the first lens 120. The light beam passing through the first projection lens 110 and traveling to the first lens 120 is illustrated as a dotted line.

The second projection lens 114 is disposed to receive at the light beam provided by the light-guiding module 108. The second projection lens 114 has a first exit pupil 116 and a second exit pupil 118. The first exit pupa 116 and the second exit pupil 118 are arranged to be a row. Thus, the first exit pupil 116 and the second exit pupil 118 are arranged to be next to each other without any gap. In addition, the entrance pupil 112 and one of the first exit pupil 116 and the second exit pupil 118 have the same area.

The light-guiding module 108 is configured to switch the light beam L provided by the light-source unit in time and guide the switched light beam to the second projection lens 114 through the first light-guiding unit 124 or the second light-guiding unit 126. In the present embodiment, after the light beam L enters the light-guiding module 108 through the first lens 120, the light beam L can be switched to become two light beams corresponding to different time points, in which two optical paths of the light beams are respectively coupled to the first exit pupil 116 and the second exit pupil 118 of the second projection lens 114 through the first light-guiding unit 124 and the second light-guiding unit 126, as the light beams L' and L" illustrated in FIG. 1. In other words, the two light beams are guided to the second projection lens 114 by the first light-guiding unit 124 and the second light-guiding unit 126 respectively, and the two light beams pass through the second projection lens 114 via the first exit pupil 116 and the second exit pupil 118.

Under this configuration, since the first exit pupil 116 and the second exit pupil 118 of the second projection lens 114 configured to allow the light beams L' and L" to pass therethrough are arranged to be the row closely, a sum area of the first exit pupil 116 and the second exit pupil 118 arranged in the second projection lens 114 is twice the area of entrance pupil 112 of the first projection lens 110. In other words, the etendue provided by the second projection lens 114 is twice the etendue of the light-source unit 102 received by the first projection lens 110. The following descriptions are provided with respect to switching the light beam by the light-guiding module 108.

Figure 3:
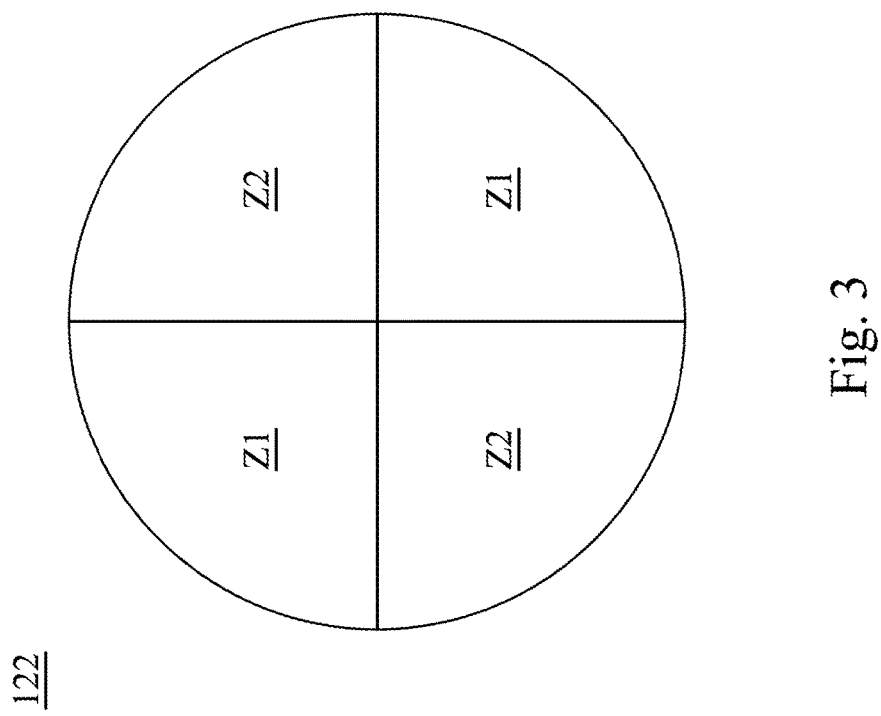
FIG. 3 is a schematic front view of the mirror wheel illustrated in FIG. 1.

FIG. 3 is a schematic front view of the mirror wheel 122 illustrated in FIG. 1. As shown in FIGS. 1 and 3, in the configuration of the light-guiding module 108, the light beam L can be converged to a side of the first lens 120 through the first projection lens 110, and then the light beam L converged to the side of the first lens 120 is guided to the mirror wheel 122 by the first lens 120. In the present embodiment, the light-guiding module 108 further includes a fourth light-guiding unit 130. The fourth light-guiding unit 130 is configured to guide the light beam L passing through the first lens 120 to the mirror wheel 122, in which the fourth light-guiding unit 130 includes a first mirror 132 and a second lens 136.

The first mirror 132 is optically coupled between the first lens 120 and the mirror wheel 122, and first mirror 132 is configured to guide the light beam propagated from the first lens 120 to the mirror wheel 122. The second lens 136 is optically coupled between the first mirror 132 and the mirror wheel 122, and second lens 136 is configured to converge the light beam propagated from the first mirror 132 on the mirror wheel 122. Thus, the light beam passing through the first lens 120 is reflected from the first mirror 132 to the second lens 136, and then the light beam L is converged on the mirror wheel 122 by the second lens 136. With the disposition of the second lens 136, the light beam L can be collected on the mirror wheel 122 more effectively, thereby reducing the optical loss in the system.

After the light beam L is collected on the mirror wheel 122 through the second lens 136, the mirror wheel 122 can allow the light beam L reaching the mirror wheel 122 to pass therethrough at a first time point and to be reflected therefrom at a second time point, in which the first time point is different from the second time point. In this regard, the mirror wheel 122 has first zones Z1 and second zones Z2. The first zones Z1 are configured to allow a light beam reaching the first zones Z1 to pass therethrough, and the second zones Z2 are configured to allow a light beam reaching the second zones Z2 to reflect therefrom. In addition, a ratio of a total area of the first zones Z1 to a total area of the second zones Z2 is in a range from 0.5 to 1.5. For example, in the present embodiment, the number of the first zones Z1 is two and the number of the second zones Z2 is two, and the total area of the first zones Z1 and the total area of the second zones Z2 are the same.

With this configuration, the light beam L propagated from the first lens 120 and converged by the second lens 136 can pass through the mirror wheel 122 through the first zones Z1 at a first time point, so as to become a transmission light beam. Then, the light beam L propagated from the first lens 120 and converged by the second lens 136 can be reflected from the mirror wheel 122 to the first lens 120 through the second zones Z2 at a second time point, so as to become a reflection light beam. The first time point is different from the second time point. In other words, the light beam L emitted from the light-source unit 102 can be switched to become two light beams in the different time points by the mirror wheel 122 of the light-guiding module 108, in which one of the light beams is the reflection light beam and another one of the light beams is the transmission light beam. The optical paths of the reflection light beam and the transmission light beam are respectively illustrated later. In addition, in the present embodiment, the transmission light beam and the reflection light beam are respectively defined by transmitting the mirror wheel 122 reflecting from the mirror wheel 122. The following descriptions are respectively provided with respect to the optical paths of the transmission light beam and the reflection light beam.

Figure 4:
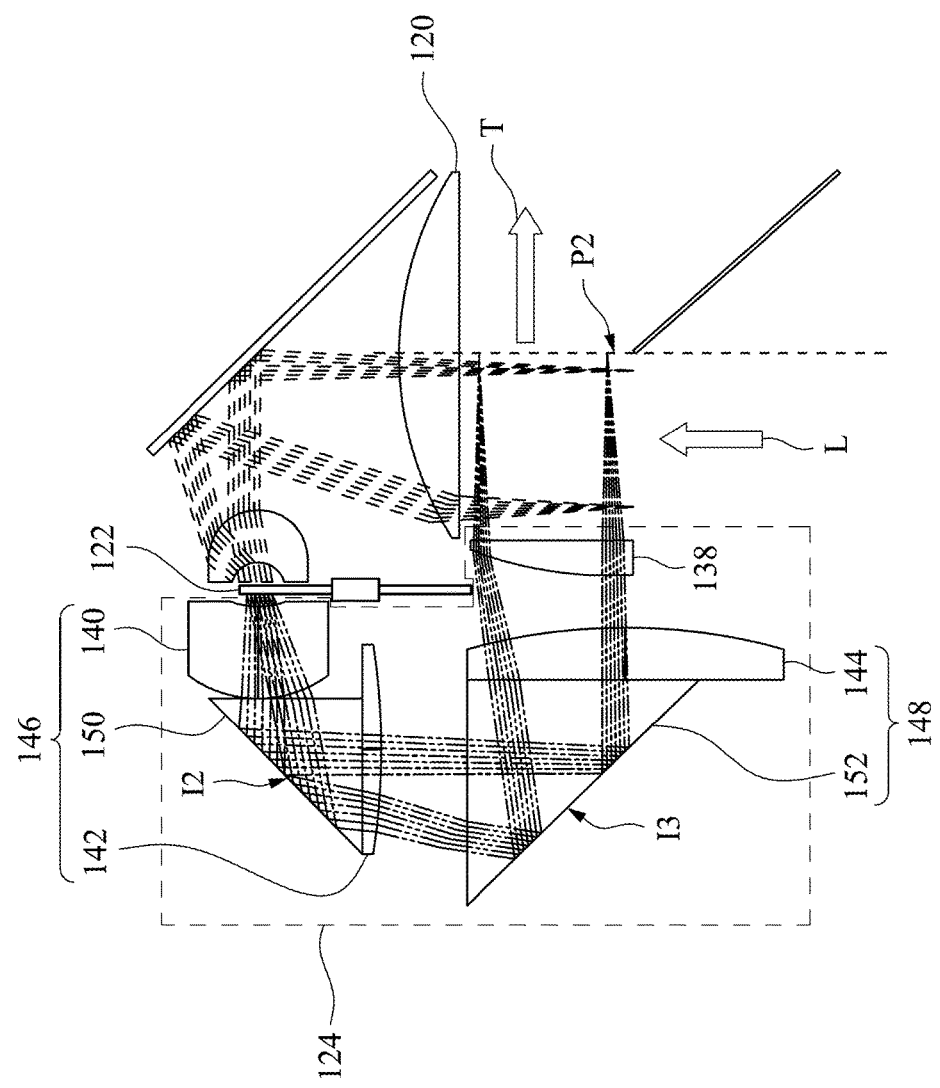
FIG. 4 is a schematic diagram showing an optical path of the transmission light beam of the light-source module illustrated in FIG. 1.

FIG. 4 is a schematic diagram showing an optical path of the transmission light beam T of the light-source module 100 illustrated in FIG. 1. The optical path illustrated in FIG. 4 begins at a side of the first lens 120. As previously described, the light beam L can pass through the mirror wheel 122 through the first zones Z1 (see FIG. 3) at the first time point, so as to become the transmission light beam T. Herein, the "transmission light beam T" is the light beam passing through the mirror wheel 122, in which the light beam is illustrated as a line with a different from after transmitting the mirror wheel 122.

The first light-guiding unit 124 is disposed to receive and guide the transmission light beam T. In other words, the transmission light beam T passing through the mirror wheel 11 can enter the first light-guiding unit 124. The first light-guiding unit 124 includes a first reflection unit 146, a second reflection unit 148, and a third lens 138. The second reflection unit 148 is optically coupled between the first reflection unit 146 and the third lens 138.

The first reflection unit 146 includes a first total internal reflection (TIR) prism 150, a fourth lens 140, and a fifth lens 142, in which the first TIR prism 150 is optical coupled between the fourth lens 140 and the fifth lens 142. The second reflection unit 148 includes a second TIR prism 152 and a sixth lens 144, in which the sixth lens 144 is optical coupled between the second TIR prism 152 and the third lens 138. In the configuration of optical paths of the first reflection unit 146 and the second reflection unit 148, the transmission light beam T can pass through the fourth lens 140, the first TIR prism 150, the fifth lens 142, the second TIR prism 152, the sixth lens 144 in sequence. In addition, the fourth lens 140, the fifth lens 142, and the six lens 144 can be configured to reduce the optical loss in the system.

Under this configuration, the first light-guiding unit 124 includes at least one reflective interface, such that the first light-guiding unit 124 can make the transmission light beam T be deflected by an angle of at least 90 degrees through the reflective interface. For example, in the present embodiment, the first light-guiding unit 124 can include two reflective interfaces I2 and I3. The reflective interfaces I2 and I3 are respectively located at the first TIR prism 150 of the first reflection unit 146 and the second TIR prism 152 of the second reflection unit 148, such that the first light-guiding unit 124 can make the transmission light beam T be deflected by an angle of 180 degrees through the reflective interfaces I2 and I3. In other words, the traveling direction of the transmission light beam T passing through the mirror wheel 122 is contrary to the traveling direction of the transmission light beam T reflected from the first reflection unit 146 and the second reflection unit 148 in sequence (thus, the angle difference between two transmission light beams T is 180 degrees).

Then since the second reflection unit 148 is optical coupled between the first reflection unit 146 and the third lens 138, after the transmission light beam T entering the first light-guiding unit 124 from the mirror wheel 122 is reflected from the first reflection unit 146 and the second reflection unit 148 in sequence, the transmission light beam T can enter the third lens 138. The third lens 138 has a focal plane P2, in which the third lens 138 can converge the transmission light beam T propagated from the second reflection unit 148 on the focal plane P2 thereof and make the transmission light beam T to travel toward the first exit pupil 116 of the second projection lens 114 (see FIG. 1). In other words, the first light-guiding unit can guide the transmission light beam T through the third lens 138, such that the transmission light beam T can enter the first exit pupil 116 of the second projection lens 114 (see FIG. 1), as the light beam L' in FIG. 1.

Figure 5:
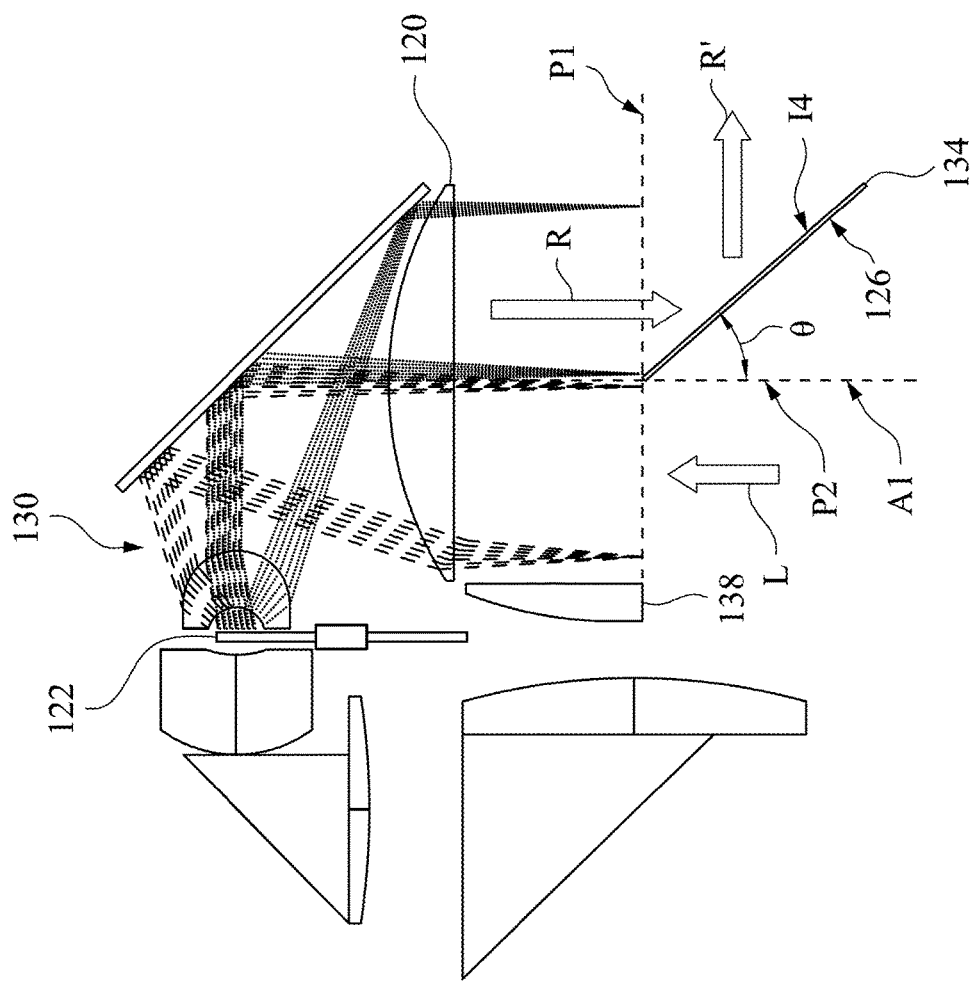
FIG. 5 is a schematic diagram showing an optical path of the reflection light beam of the light-source module illustrated in FIG. 1.

FIG. 5 is a schematic diagram showing an optical path of the reflection light beam R of the light-source module 100 illustrated in FIG. 1. The optical path illustrated in FIG. 5 begins at the side of the first lens 120. As previously described, the light beam L can be reflected from the mirror wheel 122 through the second zones Z2 (see FIG. 3) at the second time point, so as to become the reflection light beam R. Herein, the "reflection light beam R" is the light beam reflected from the mirror wheel 122, in which the light beam is illustrated as a line with a different from after being reflected from the mirror wheel 122.

The second light-guiding unit 126 is disposed to receive and guide the reflection light beam R passing through the first lens 120. In other words, after the reflection light beam R reflected from the mirror wheel 122 passes through the fourth light-guiding unit 130 and first lens 120 in sequence, the reflection light beam R can enter the second light-guiding unit 126. The second light-guiding unit 126 includes a second mirror 134. The first lens 120 can be optically coupled between the mirror wheel 122 and the second mirror 134, and the second mirror 134 can be optically coupled between the first lens 120 and the second projection lens 114 (see FIG. 1). The second mirror 134 has a reflective interface I4. The reflective interface I4 is extended along an extending direction slanted at an angle θ relative to an optical axis A1 of the first lens 120, in which the angle θ is in a range from 30 degrees to 60 degrees. For example, in the present embodiment, the reflective interface I4 can be extended along the extending direction slanted at an angle θ of 45 degrees relative to the optical axis A1 of the first lens 120. In addition, the optical axis A1 of the first lens 120 can be present within the focal plane P2 of the third lens 138. In order not to make FIG. 5 too complicated, the optical axis A1 of the first lens 120 and the focal plane P2 of the third lens 138 are expressed as the same dot line.

The first lens 120 has a focal pane P1, in which the first lens 120 can converge the reflection light beam R propagated from the fourth light-guiding unit 130 on a focal plane P1 thereof. The focal plane P1 of the first lens 120 and the focal plane P2 of the third lens 138 are orthogonal to each other. Under the configuration in which the extended direction of the reflective interface I4 of the second mirror 134 is slanted at an angle of 45 degrees relative to the optical axis A1 of the first lens 120, the extending direction of the reflective interface I4 of the second mirror 134 can equally divide the angle between the focal plane P1 of the first lens 120 and the focal plane P2 of the third lens 138.

Since the first lens 120 is optically coupled between the mirror wheel 122 and the second mirror 134, the reflection light beam R converged on the focal plane P1 of the first lens 120 by the first lens 120 can travel toward the second mirror 134 and then be reflected from the second mirror 134. Under the configuration in which the extended direction of the reflective interface I4 of the second mirror 134 is slanted at an angle of 45 degrees relative to the optical axis A1 of the first lens 120, the traveling direction of the reflection light beam R passing through the first lens 120 is orthogonal to the traveling direction of the reflection light beam R' reflected from the second mirror 134 (thus, the angle difference between two reflection light beams R is 180 degrees.)

Furthermore, since the second mirror 134 is optically coupled between the first lens 120 and the second projection lens 114 (see FIG. 1), the second light-guiding unit 126 can guide and make the reflection light beam R to become the reflection light beam R' and then the reflection light beam R' can enter the second exit pupil 118 of the second projection lens 114 (see FIG. 1), as the light beam L" illustrated in FIG. 1.

In addition, the transmission light beam T illustrated in FIG. 4 and the reflection light beam R' illustrated in FIG. 5 are respectively guided to the same side of the first lens 120 by the first light-guiding unit 124 and the second light-guiding unit 126. In other words, the transmission light beam T and the reflection light beam R' can respectively enter the first exit pupil 116 and the second exit pupil 118 of the second projection lens 114 from the same side of the first lens 120.

Figure 6:
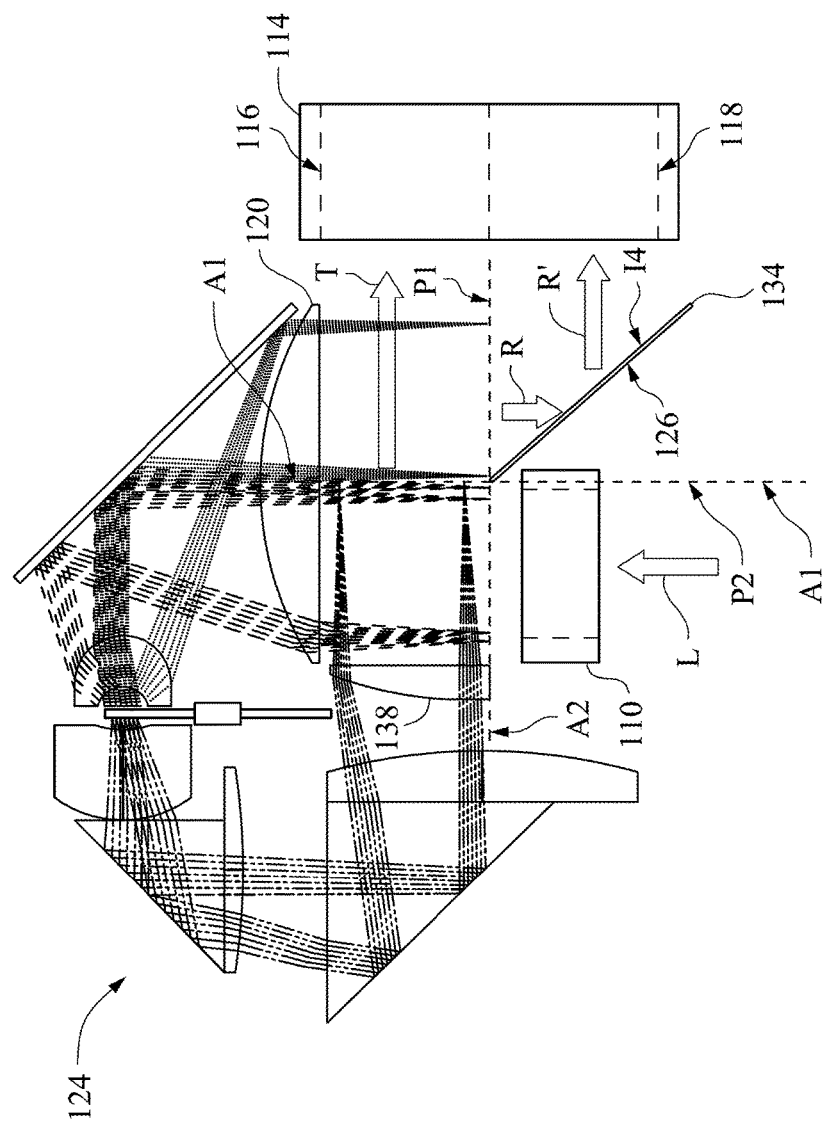
FIG. 6 is a schematic diagram showing the light-source module illustrated in FIG. 1 provides the reflection light beam and the transmission light beam simultaneously.

With the above configuration, the light-source module can switch the light beam provided by the light-source unit to the transmission light beam and the reflection light beam and output the transmission light beam and the reflection light beam, as shown in FIG. 6, in which FIG. 6 is a schematic diagram showing the light-source module 100 illustrated in FIG. 1 provides the reflection light beam R and the transmission light beam T simultaneously. In order not to make FIG. 6 too complicated, the light-source 102 (see FIG. 1) is not illustrated in FIG. 6. In addition, the combination of the lenses and prisms in the present embodiment illustrated in FIG. 6 is an exemplification, a person having ordinary skill in the art may adjust the optical paths of the transmission light beam T and the reflection light beam R.

On the other hand, under the configuration in which the extended direction of the reflective interface I4 of the second mirror 134 is slanted at an angle of 45 degrees relative to the optical axis A1 of the first lens 120, the optical axis A1 of the first lens 120, the optical axis A2 of the third lens 138, an edge of the second mirror 134 can be at least intersected at one point. With this configuration, the reflection light beam R converged on the focal plane P1 of the first lens 120 by the first lens 120 (which is expressed with the optical A2 of the third lens 138 as the same dot line) can be reflected and transformed to be coplanar to the focal plane P2 of the third lens 138 (which is expressed as the optical A1 of the first lens 120 as the same dotted line) through the second mirror 134. Therefore, as far as the second projection lens 114 is concerned, the transmission light beam T and the reflection light beam R which are respectively guided by the first light-guiding unit 124 and second light-guiding unit 126 are converged upon the same plane.

By this configuration, the difference between the transmission light beam T and the reflection light beam R reaching the second projection lens 114 can be reduced, thereby making the transmission light beam T and the reflection light beam R' respectively passing through the first exit pupil 116 and the second exit pupil 118 of the second projection lens 114 can have the same property. For example, the transmission light beam T and the reflection light beam R' respectively passing through the first exit pupil 116 and the second exit pupil 118 of the second projection lens 114 can have the same traveling direction.

As described above, the light-source module of the present disclosure includes the light-source unit, the light-guiding module, the first projection lens, and the second projection lens, in which the light-guiding module includes the first lens, the mirror wheel, the first light-guiding unit, and the second light-guiding unit. The light-source module can switch the light beam provided by the light-source unit to the transmission light beam and the reflection light beam through the mirror wheel. The mirror wheel can make the light beam provided by the light-source unit become the transmission light beam at the first time point and make the light beam provided by the light-source unit become the reflection light beam at the second time point. The transmission light beam and the reflection light beam can be respectively guided to the first exit pupil and the second exit pupil by the first light-guiding unit and the second light-guiding unit, in which the first exit pupil and the second exit pupil are arranged as the row, thereby increasing the sum area of the first exit pupil and the second exit pupil. Accordingly, the sum area is twice the area of the entrance pupil of the first projection lens. Therefore, the etendue provided by the second projection lens is twice the etendue of the light-source unit received by the first projection lens.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. A light-source module comprising:
a light-source unit configured to provide a light beam;
a first projection lens having an entrance pupil, wherein the light beam provided by the light-source unit can pass through the first projection lens via the entrance pupil;
a first lens, wherein the first projection lens is optically coupled between the light-source unit and the first lens;
a mirror wheel, wherein the first lens is disposed to guide the light beam to the mirror wheel, the light beam passes through the mirror wheel at a first time point to become a transmission light beam, and the light beam is reflected from the mirror wheel to the first lens at a second time point to become a reflection light beam, and the first time point is different from the second time point;
a first light-guiding unit disposed to guide the transmission light beam;
a second light-guiding unit disposed to guide the reflection light beam passing through the first lens, wherein the transmission light beam and the reflection light beam are respectively guided to the same side of the first lens by the first light-guiding unit and the second light-guiding unit; and
a second projection lens disposed to receive the transmission light beam and the reflection light beam and having a first exit pupil and a second exit pupil, wherein the first exit pupil and the second exit pupil are arranged to be a row, and the transmission light beam and the reflection light beam respectively pass through the second projection lens via the first exit pupil and the second exit pupil.

2. The light-source module of claim 1, wherein the first lens, the mirror wheel, the first light-guiding unit, and the second light-guiding unit are optically coupled between the first projection lens and the second projection lens.

3. The light-source module of claim 1, wherein the entrance pupil and one of the first exit pupil and the second exit pupil have the same area.

4. The light-source module of claim 1, wherein the light-source unit comprises:
a light emitter configured to provide the light beam;
a digital micro-mirror device (DMD); and
a third light-guiding unit optically coupled between the light emitter and the DMD, wherein the third light-guiding unit is configured to guide the light beam emitted from the light emitter to the DMD and guide the light beam reflected from the DMD to the first projection lens.

5. The light-source module of claim 1, further comprising a fourth light-guiding unit comprising:
a first mirror optically coupled between the first lens and the mirror wheel and configured to guide the light beam propagated from the first lens to the mirror wheel; and
a second lens optically coupled between the first mirror and the mirror wheel and configured to converge the light beam propagated from the first mirror on the mirror wheel.

6. The light-source module of claim 1, wherein the first light-guiding unit comprises at least one reflective interface, and the first light-guiding unit makes the transmission light beam be deflected by an angle of at least 90 degrees through the reflective interface.

7. The light-source module of claim 1, wherein the first light-guiding unit comprises a first reflection unit, a second reflection unit, and a third lens, wherein the second reflection unit is optically coupled between the first reflection unit and the third lens, and the transmission light beam enters the third lens after the transmission light beam passing through the mirror wheel is reflected from the first reflection unit and the second reflection unit in sequence, and the first light-guiding unit guides the transmission light beam to the first exit pupil through the third lens.

8. The light-source module of claim 7, wherein the first lens converges the reflection light beam on a focal plane thereof, the third lens converges the reflection light beam on a focal plane thereof, and the focal plane of the first lens and the focal plane of the third lens are orthogonal to each other.

9. The light-source module of claim 8, wherein the second light-guiding unit comprises a second mirror having a reflective interface, wherein the reflective interface is extended along an extending direction equally dividing an angle between the focal plane of the first lens and the focal plane of the third lens, and the second light-guiding unit guides the reflection light beam to the second exit pupil through the reflective interface of the second mirror.

10. The light-source module of claim 9, wherein an optical axis of the first lens, an optical axis of the third lens, an edge of the second mirror are at least intersected at one point.

11. The light-source module of claim 1, wherein the second light-guiding unit comprises a second mirror having a reflective interface, wherein the reflective interface is extended along an extending direction slanted at an angle relative to an optical axis of the first lens, wherein the angle is in a range from 30 degrees to 60 degrees, and the second light-guiding unit guides the reflection light beam to the second exit pupil through the reflective interface of the second mirror.

12. The light-source module of claim 1, wherein the mirror wheel has at least one first zone and at least one second zone, the first zone is configured to allow the light beam to pass therethrough at the first time point, so as to become the transmission light beam, the second zone is configured to allow the light beam to reflect back to the first lens at the second time point, so as to become the reflection light beam, and a ratio of an area of the first zone to an area of the second zone is in a range from 0.5 to 1.5.

* * * * *